(12) United States Patent
Kim

(10) Patent No.: US 6,840,212 B2
(45) Date of Patent: Jan. 11, 2005

(54) WING STRUCTURE OF AIR SWIRLING DEVICE FOR INTERNAL COMBUSTION ENGINE

(76) Inventor: Sei Young Kim, 1F Baekim Rd., G61-9, Anyang 2-Dong, Anyang city, Kyunggi-Do (KR)

( * ) Notice: Subject to any disclaimer, the term of this patent is extended or adjusted under 35 U.S.C. 154(b) by 0 days.

(21) Appl. No.: 10/277,892

(22) Filed: Oct. 23, 2002

(65) Prior Publication Data

US 2003/0131821 A1 Jul. 17, 2003

(51) Int. Cl.$^7$ .............................................. F02M 29/00
(52) U.S. Cl. ........................................ 123/306; 123/590
(58) Field of Search .................................. 123/306, 590, 123/592, 591, 593

(56) References Cited

U.S. PATENT DOCUMENTS

| | | | | |
|---|---|---|---|---|
| 1,778,790 A | * | 10/1930 | Brandl et al. | 48/189.4 |
| 2,028,937 A | * | 1/1936 | Lefebre | 48/189.4 |
| 4,962,642 A | | 10/1990 | Kim | 123/590 |
| 5,113,838 A | | 5/1992 | Kim | 123/592 |
| 5,685,281 A | * | 11/1997 | Li | 123/590 |
| D414,191 S | | 9/1999 | Kim | D15/5 |
| 5,947,081 A | | 9/1999 | Kim | 123/306 |
| 6,258,144 B1 | * | 7/2001 | Huang | 55/385.3 |
| D469,781 S | * | 2/2003 | Kim | D15/5 |
| 6,536,420 B1 | * | 3/2003 | Cheng | 123/590 |
| 6,550,446 B1 | * | 4/2003 | Robley, Jr. | 123/306 |
| 2003/0226539 A1 | * | 12/2003 | Kim | 123/306 |

* cited by examiner

Primary Examiner—Hai Huynh
(74) Attorney, Agent, or Firm—Procopio Cory Hargreaves & Savitch

(57) ABSTRACT

An air swirling device adapted to be used in the air flow system of an internal combustion engine which comprises a swirling device body having a external dimension adapted for incorporation into said air flow system, a plurality of wing members having upper and lower side surfaces, said wing members extending radially and slantingly from the periphery of the swirling device body toward the center therof, and wherein at least one of the upper and lower side surfaces has a non-linear configuration.

8 Claims, 4 Drawing Sheets

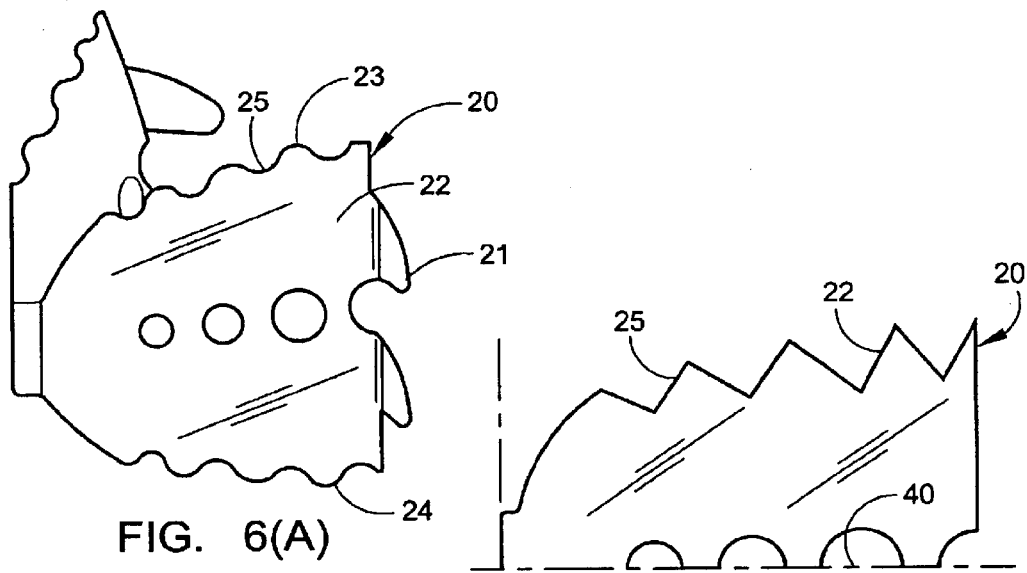
FIG. 6(A)
FIG. 6(B)
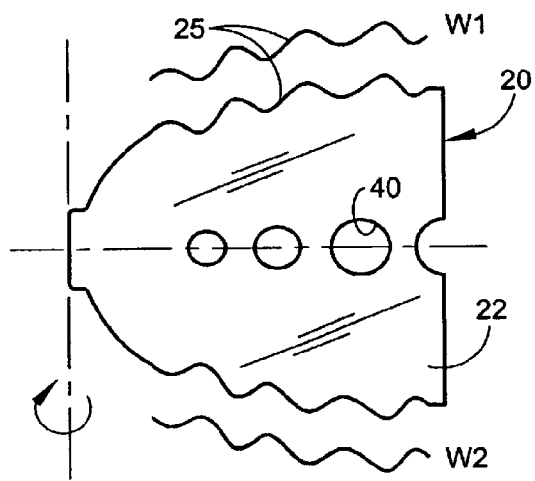
FIG. 7
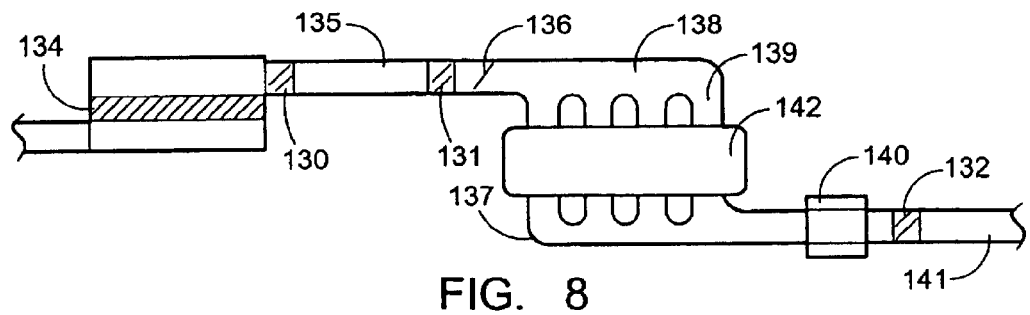
FIG. 8

WING STRUCTURE OF AIR SWIRLING DEVICE FOR INTERNAL COMBUSTION ENGINE

This nonprovisional application claims priority under 35 U.S.C. § 119(a) on Patent Application No. 2001-32339 filed in Korea on Oct. 23, 2001, which is herein incorporated by reference.

BACKGROUND OF THE INVENTION

1. Field of the Invention

The present invention relates to a wing structure of an air swirling device for use in an internal combustion engine, and more particularly, to the wing structure of an air swirling device used in an air cleaner or an air duct of an internal combustion engine, which induces a swirl action of the air which is filtered through the air cleaner of a spark ignition internal combustion engine of the carburetor or fuel injection type or diesel engine type. The wing structure of the swirling device introduces air flow into the combustion chamber of the engine, which is effective in reducing resistance due to negative pressure (or minus pressure), thereby reducing wing deformation and improving the air flow level.

2. Background of the Related Art

It is known that swirling devices of internal combustion engines can provide a large amount of high density air flow to the combustion chamber of an engine by adding revolution force to the air flow provided to the combustion chamber of the internal combustion engine and increasing the flow speed per unit of time. The combustion action of the engine is thus improved and engine power is increased. The prior art has the disadvantage that the air resistance generated when the air flow is rotated cannot be completely prevented.

For example, Japanese Patent Publication Nos. 53-26247, 59-11722, and U.S. Pat. No. 4,309,969 disclose a simple turbulence device, which includes an intake valve having a large intake resistance so that the swirling device does not create a uniform air flow but rather creates only a turbulent flow. Japanese Patent Publication Nos. 60-17922 and 61-10645, U.S. Pat. Nos. 4,424,777, 4,432,312 and 4,539,954 disclose a swirling device having wings which are disposed in the vicinity of the intake valve for producing a swirling air flow. However, such a device exhibits a high amount of friction resulting in a reduced amount of inlet air and thus is used only for a gasoline engine of the carburetor type.

To solve the above problems, U.S. Pat. No. 4,962,642 discloses an air swirling device having a plurality of wings positioned within an air cleaner of an internal combustion engine for swirling the air flow into the combustion chamber so that the combustion performance and engine power can be improved. However, such a device has various disadvantages, such as for example, reduced output of the engine due to a reduced quantity of inlet air and a loss of fuel because of the eddies generated at the rear surface (negative pressure zone) of the wings when the air flow is swirled.

To solve the above problems, Korean Utility Model Registration No. 67786 discloses a swirling device for an internal combustion engine having a swirling device body 10 and provided with a plurality of wings 11 having one or more small and long slits 12, as shown in FIGS. 1 and 2. The swirling device body 10 is fixed and mounted in the vicinity of the center of an air cleaner 13 with bolts and nuts for swirling the intake air, so that eddies generated at the negative pressure zone formed on the rear surface of the wings 11 when the air enters, is prevented. As the result, air resistance is reduced and the amount of air is increased, so that a complete combustion is achieved, which improves energy efficiency and engine power.

As shown in FIG. 1, the swirling device having the slits 12 in the wings 11 adds a revolution force to the air flow introduced into the combustion chamber 14, so that the air flow speed per unit time is increased, thereby improving the high density combustion action. During the intake operation of the internal combustion engine caused by the slits 12 formed in the wings 11, the air filtered in the air cleaner 13 passes and rotates through the slits 12 formed in the wings 11 of the swirling device 10 mounted in the air cleaner 13. The rotated air flow is swirled again by another swirling device 16 mounted near the inlet of the intake manifold 15 and introduced into the combustion chamber 14 at high speed. The combusted exhaust gas is rapidly discharged by another swirling device 18 mounted near the inlet of the exhaust manifold 17.

Because the swirling device of the internal combustion engine has at least one or more of slits 12 in the plurality of wings 11, eddy generation at the negative pressure zone of the rear surfaces of the wings is reduced. When the swirling device is placed in the air cleaner 13, the carbon monoxide (CO) gas level can be reduced up to 17% at engine idle speed; the engine power can be increased up to 11%; fuel economy can be improved up to 6%; and knocking of the engine can be reduced up to 5%.

Therefore, the swirling device of the internal combustion engine having the slits 12 in the wings 11 adds a revolution force to the air flow introduced into the combustion chamber, so that the air flow speed per unit of time is increased and the combustion action, due to increased density, is improved. Furthermore, in the swirling device of the internal combustion engine, eddy generation at the negative pressure zone by the slits 12 formed in the wings 11 is prevented, and thereby, the air flow resistance is reduced and the amount of the air flow is increased, so that an effective amount of accelerated air is introduced into the engine to increase its combustion efficiency and engine power.

However, the slits 12 formed in the wings 11 of the conventional swirling device of the internal combustion engine are not completely ideal in reducing eddy because of being formed by cutting portions of the flat sheet type wings 11 both small and long. According to such circumstances, the conventional swirling device of an internal combustion engine containing slits 12 formed in the wings 11 cannot cope with a more controlled air flow.

For example, the conventional swirling device of the internal combustion engine having the slits 12 formed in the wings 11 increases air flow speed per unit time and raises the density of the air by adding revolution force to the air flow introduced into the combustion chamber so that the combustion action and the engine power are improved. However, only a single swirling device cannot control the air flow conditions because a supercharging of the air by the swirling device may occur.

Moreover, in the conventional swirling device, the small and long rectangular slits 12 are not uniformly provided in the wings 11, and thus the wings 11 have a higher deformation rate than perforated type wings. The deformation of the wings reduces the amount of air flow.

Additionally, because the shape of the wings for preventing eddy generation at the negative pressure zone by forming the slits 12 in the wings 11, produces a linear type of air flow due to the flat upper and lower side, it is difficult to maintain a stable and uniformly mixed level of air and fuel particles and to secure a sufficient amount of air flow.

SUMMARY OF THE INVENTION

Accordingly, the present invention is directed to a wing structure of an air swirling device for an internal combustion engine that substantially obviates one or more problems due to limitations and disadvantages of the related art.

Accordingly, an object of the present invention is to provide a wing structure of air swirling device for an internal combustion engine, which can increase the air flow speed per unit of time and increase the density of the air by adding a revolution force to the air flow introduced into the combustion chamber so that the combustion action and the engine power are improved.

Another object of the present invention is to provide the wing structure of an air swirling device for an internal combustion engine, which can reduce the deformation of the wings of the swirling device and improve processability for the purpose of improving the combustion action and the engine power by increasing the air flow speed per unit of time and increasing the density of the air by adding revolution force to the air flow introduced into the combustion chamber of an internal combustion engine.

A further object of the present invention is to provide a wing structure for an air swirling device utilized in an combustion engine which can increase the uniformly mixed level of air and fuel particles and the amount of air flow by changing the air flow accelerated through the wings of the swirling device into a non-linear air flow.

Additional advantages, objects, and features of the present invention will be set forth in part in the description which follows and in part will become apparent to those having ordinary skill in the art upon examination of the following or may be learned from the practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a wing structure of an air swirling device for an internal combustion engine, which has a swirling device body mounted in an air cleaner and a plurality of slantingly and radially disposed wings mounted on the swirling device body for accelerating or increasing the air flow revolution, includes non-linear type wave surfaces formed along the upper or lower side of the wing to increase the surface area in contact with the air flow.

Each of the wings has at least one or more air flow holes formed at prescribed positions for reducing air flow resistance due to eddy generation at the negative pressure zone of the wing.

The wave surfaces formed on the wings of the swirling device of the present invention increases the surface area of the wing, and thus, more air is introduced into the combustion chamber. Also, the approach angle can be rapidly changed, the straight level can be raised, the deformation of the wings can be reduced, and the processability can be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6(A) is a view of a streamlined type wave surface formed on the sides of the wings according to the present invention;

FIG. 6(B) is a view of a saw-tooth type wave surface formed on the sides of the wings according to the present invention;

FIG. 7 is a reference view showing an operation of a part of the present invention; and FIG. 8 is a schematic view of the swirling device of the present invention utilized in an internal combustion engine.

DETAILED DESCRIPTION OF THE PREFERRED EMBODIMENT

Reference will now be made in detail to the preferred embodiments of the present invention, examples of which are illustrated in the accompany drawings.

Figure 1:
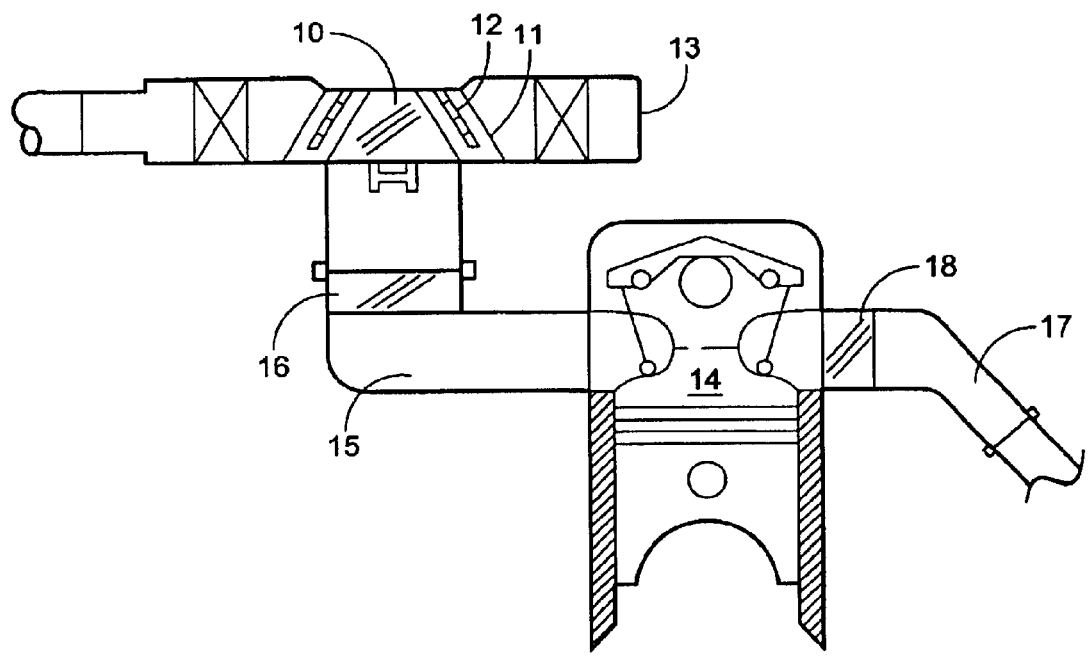
FIG. 1 is a schematic view of a conventional swirling device of an internal combustion engine.
Figure 2:
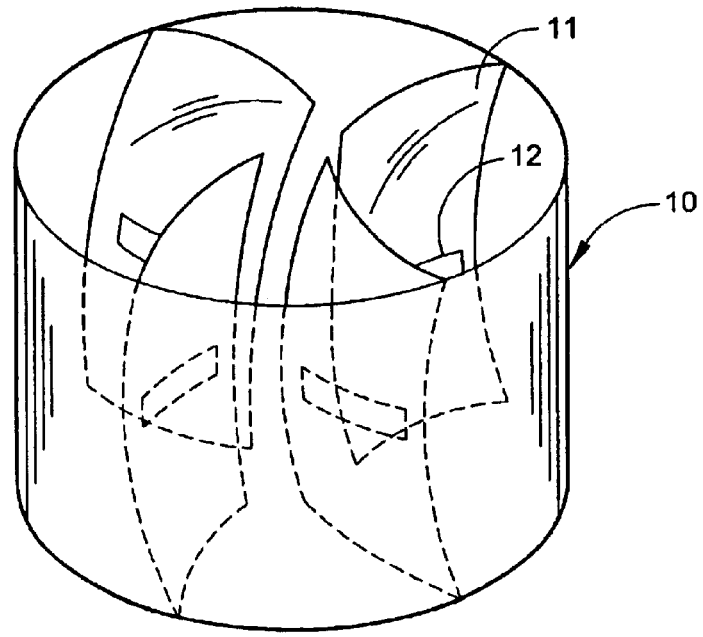
FIG. 2 is a view of the shape of a wing of a conventional swirling device.
Figure 3:
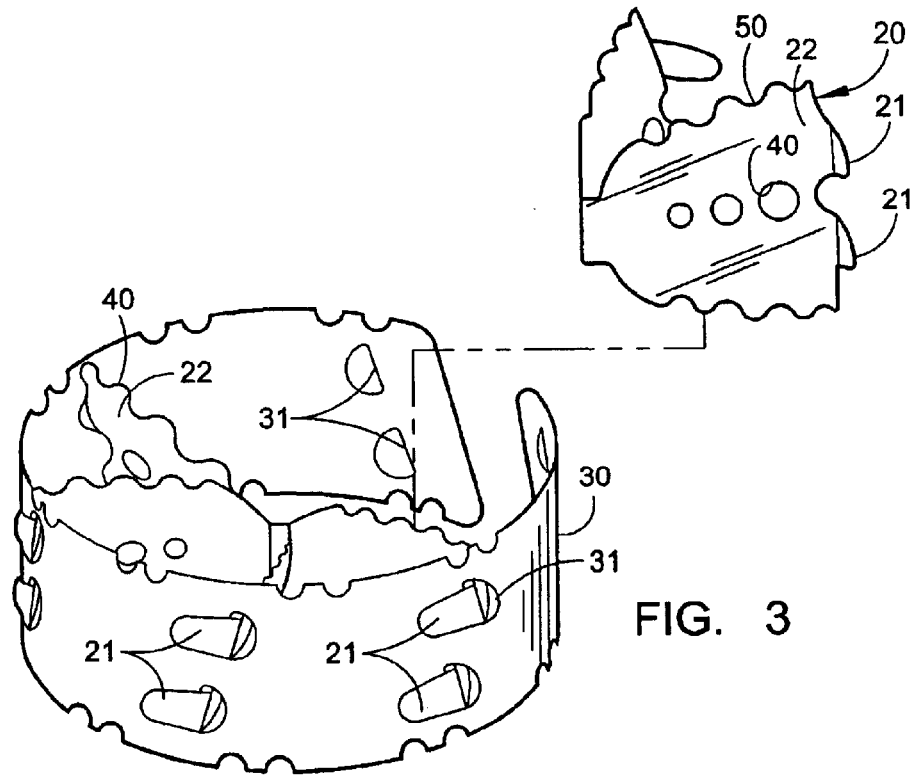
FIG. 3 is an exploded view of the wings of a swirling device according to the present invention.
Figure 4:
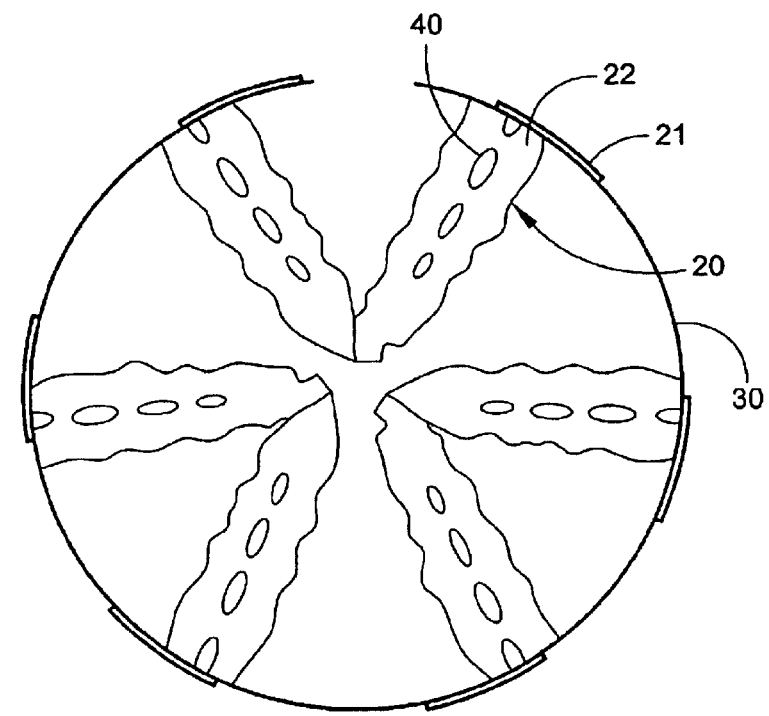
FIG. 4 is a plan view of the swirling device embodying the wings of the present invention.

FIGS. 3-7 show various examples of wings of the swirling device of an internal combustion engine according to the present invention. FIG. 3 is a partially exploded perspective view of wings 20 coupled to a swirling device body 30; FIG. 4 is a plan view of the wings 20 assembled together with the swirling device body 30; FIGS. 5(A)-5(D) show various examples of shapes and arrangements of air flow holes 40 of the wings 20 of the present invention, wherein FIG. 5(A) is an example of a regular arrangement, FIG. 5(B) is an example of an independent arrangement, FIG. 5(C) is an example of a cross arrangement, and FIG. 5(D) is an example of a multiple arrangement.

A plurality of the wings 20 of the swirling device of the internal combustion engine according toe the present invention, as shown in FIG. 3, are mounted slantingly and radially on the swirling device body 30, so as to accelerate and increase air revolution. Each of the wings 20 has at least one or more of air flow holes 40 formed at prescribed positions for preventing eddy generation at a negative pressure zone in the rear surface thereof.

Furthermore, the wing 20 has wave surfaces 25 on the upper and lower peripheral sides thereof for creating non-linear type air flow, so that mixing of the air and fuel particles is accelerated.

In FIGS. 3 and 4, reference element 21 identifies protrusions 21 formed on the wings, and element 31 indicates through holes formed in the swirling device body for receiving and coupling with the protrusions of the wing.

A plurality of air flow holes 40 are formed in the wings 20 for reducing air flow resistance due to eddies generated at the negative pressure zone of the wing 20, and their arrangement may be exemplified by one of FIGS. 5(A)-5(D).

Figure 5A:
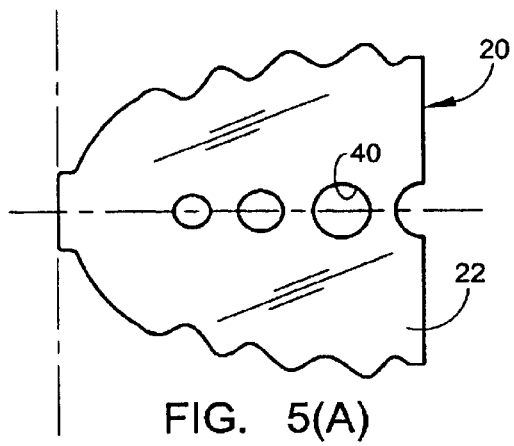
FIGS. 5(A)-5(D) are views of examples showing various arrangements of the air flow holes according to the present invention.

FIG. 5(A) shows a regular arrangement of the air flow holes 40, wherein at least one or more of the air flow holes 40 are arranged regularly and uniformly along a surface 22 of the wings 20, in a line.

Figure 5B:
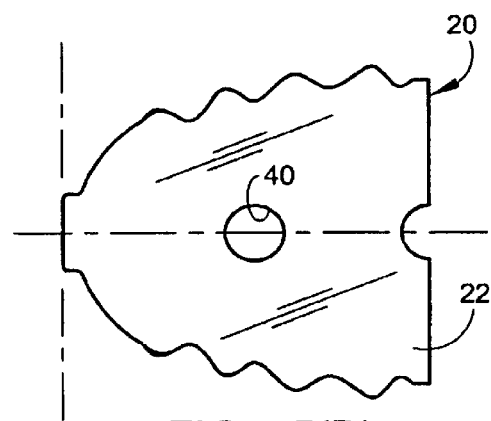

FIG. 5(B) shows an independent arrangement of the air flow holes 40, wherein the air flow holes 40 having an enlarged air flow area are arranged at the centers of the wings 20 along the surfaces 22 of the wings 20.

Figure 5C:
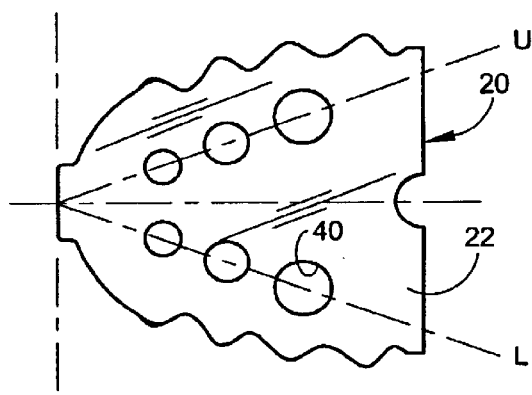

FIG. 5(C) shows a concentrated cross arrangement of the air flow holes 40, wherein the air flow holes 40 are divided into an upper part and a lower part and arranged along the surfaces 22 of the wings 20 in tow or more lines.

Figure 5D:
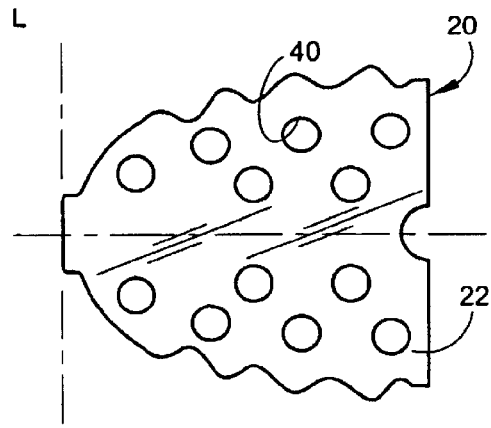

FIG. 5(D) shows a multiple arrangement of the air flow holes 40, wherein the air flow holes 40 are arranged along the surfaces of the wings 40 so as to substantially cover the surface area of the wings without regard to their own positions.

Furthermore, the wave surfaces 25 for inducing non-linear type air flow at the upper and lower side 23 and 24 can be selectively formed on the upper side 23 or the lower side 24. As shown in the drawings, the wave surfaces may be streamline-type wave surfaces (a) or saw-tooth type wave surfaces (b), or it will be appreciated that other type wave surfaces may be formed in consideration of characteristics of the air flow. The number of the wave surfaces 25 formed on the sides of the wing 20 may be formed at need.

The wings 20 of the swirling device of the internal combustion engine having the air flow holes 40 and the wave surfaces 25 can enhance the characteristics obtained by the wings of a conventional swirling device. That is, the wings of the swirling device according to the present invention can increase air flow speed per unit time and raise the air density by increasing the revolution force in the air flow introduced into the combustion chamber of the internal engine, so that the combustion action of the engine and engine power are improved.

As shown in FIGS. 5(A)-5(D), the plurality of the air flow holes 40 have various sizes, but the complete combustion and output performance cannot be obtained only by selecting the arrangement and shape of the holes. The complete combustion and output performance depend on the conditions of the engine. Both the slits 12 of the prior art and the air flow holes 40 of the present invention, cannot achieve the complete combustion and output performance by only a difference in their shapes.

When the air flow holes 40 are formed in the surfaces 22 of the wings 20 for preventing eddies generated at the negative pressure zone, a more systematic design can be utilized. That is, the swirling device can be designed for the engine by the arrangement and size of the air flow holes 40 according to the engine condition. Therefore, the present invention can provide a swirling device which can be suited to the engine condition.

Additionally, the air flow holes 40 can be press-finished in various arrangements and sizes in a relatively narrow area of the wing 20.

In consideration of the fact that eddy formation is severe at the outer wall, and is reduced at the center, because the revolution force of the wings 20 is increased at the outer wall, and is reduced at the center, it is preferable that the sizes of the air flow holes 40 are gradually reduced toward the center.

If circular air flow holes 40 and not slits are formed in the surfaces of the sheet type wings 20, self internal power is generated because there is no distortion and the circular air flow holes 40 are smaller in deformation after the press finishing than rectangular holes.

Also, the wave surfaces 25 formed in the longitudinal direction along the sides not in contact with the swirling device body 30 when the wings 20 are mounted on the swirling device body 30, i.e., the upper side 23 and the lower side 24, can change the air flow which collides along the outermost walls of the wings 20 when the wings 20 are rotated, into non-linear type wave forms (W1, W2) as shown in FIG. 7, and maintain the air flow uniformly.

The non-linear type air flow provides an indirect stirring effect when the air is mixed with the fuel particles, so that the mixing level of the air and the fuel particles is good.

Furthermore, the present invention provides an increased surface area which is in contact with the air flow, so that an increased air inflow and a rapid change of approach angle are achieved and the air flow resistance is reduced because of the increased straight level.

Moreover, when the air is introduced into the combustion chamber, the revolution force applied to the air reduces the impact due to the air of the wings and reduces the air flow resistance, so that the air flow rate into the cylinder is increased and the wings are prevented from becoming broken and have a longer life.

The wings of the swirling device according to the present invention can be used for a carburetor type or a throttle body injector type internal combustion engine. FIG. 8 schematically shows how the swirling device of the present invention can be incorporated into the operational system of a typical internal combustion engine. In FIG. 8, element 134 represents the air filter of a carburetor; element 135 represents the intake duct to the carburetor; element 136 is a throttle valve; elements 138 and 139 represent the intake manifold for the engine 142; element 137 represents the exhaust manifold; element 140 is a catalytic converter and element 141 represents the exhaust pipe. Advantageously, the swirling device of the present invention is a flexible device which can be positioned in one of the locations designated as 130, 131, or 132. Also, the swirling device can be made of a variety of materials, e.g., steel, aluminum, plastic, etc.

As described above, because the structure and shape of the wings of the swirling device of the internal combustion engine according to the present invention can be changed without using separate components, the present invention can provide the swirling device suitable for various engine conditions. Furthermore, the present invention can prevent deterioration in processability and a deformation of the eddy preventing means formed on the surfaces of the wings. Additionally, the present invention can change the air flow by changing the shape of the sides of the wings, so that the combustion action and engine power are improved and the life and performance of the swirling device are increased.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air swirling device adapted to be used in the air flow system of an internal combustion engine which comprises:

a swirling device body having an opening at each end of the body, a length of wall disposed between the open ends, and an external dimension adapted for incorporation into said air flow system;

a plurality of wing members having upper and lower side'surfaces, said side surfaces circumscribed by upper and lower sides, said wing members extending radially and slantingly from one open end to the other open end of the periphery of the swirling device body toward the center thereof, and wherein a non-linear configuration is formed on both the upper and lower sides of the wing members.

2. The air swirling device of claim 1, wherein the non-linear configurations are streamlined wave surfaces.

3. The air swirling device of claim 1, wherein the wing members contain at least one air flow hole formed at predetermined positions for reducing air flow resistance due to eddies generated at a negative pressure zone of the wing.

4. The air swirling device of claim 3, wherein a plurality of holes are provided which are arranged uniformly along the surfaces of the wings in one or more lines.

5. The air swirling device of claim 4, wherein the sizes of the air flow holes are gradually reduced toward the center of the device.

6. The air swirling device of claim 1, wherein the device has a substantially circular external dimension.

7. The air swirling device of claim 1, wherein adjacent wing members connect together near the center of the device.

8. An airflow system for an internal combustion engine which includes:

an engine;

an air cleaner connected by an intake duct to the upstream side of the engine;

an exhaust system connected to the downstream side of the engine; and an air swirling device having an opening at each end of its body positioned on either the intake duct or the exhaust system, said air swirling device containing a plurality of wing members having upper and lower side surfaces, said side surfaces circumscribed by upper and lower sides, a non-linear configuration formed on both the upper and lower sides said wing members extending radially and slantingly from one open end to the other open end the periphery of the swirling device body toward the center thereof.

* * * * *